Nov. 7, 1967  A. I. W. FRANK  3,351,388
MECHANISM FOR HANDLING AND TESTING CONTAINERS
Filed June 29, 1965  8 Sheets-Sheet 1

INVENTOR
Alan I.W. Frank

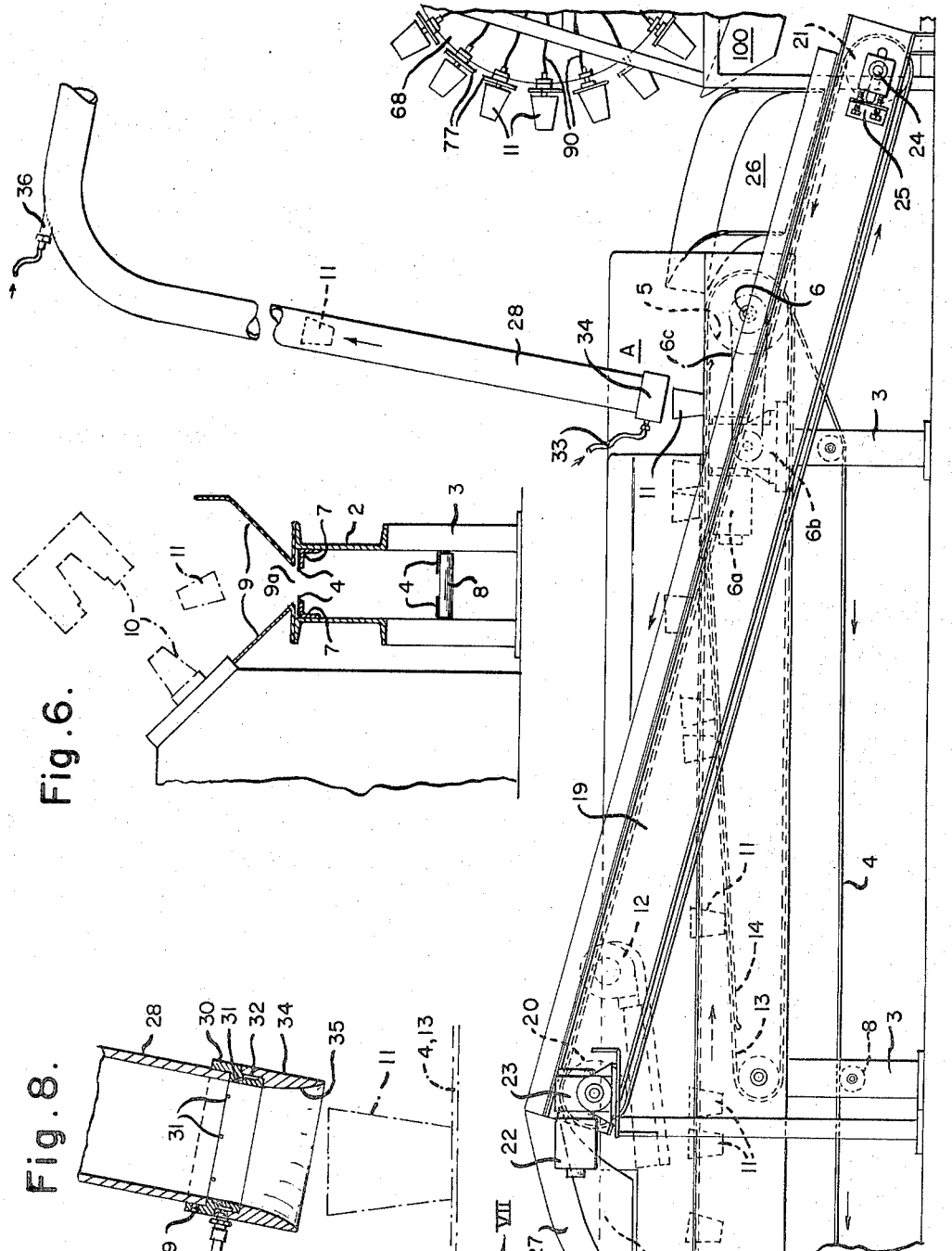
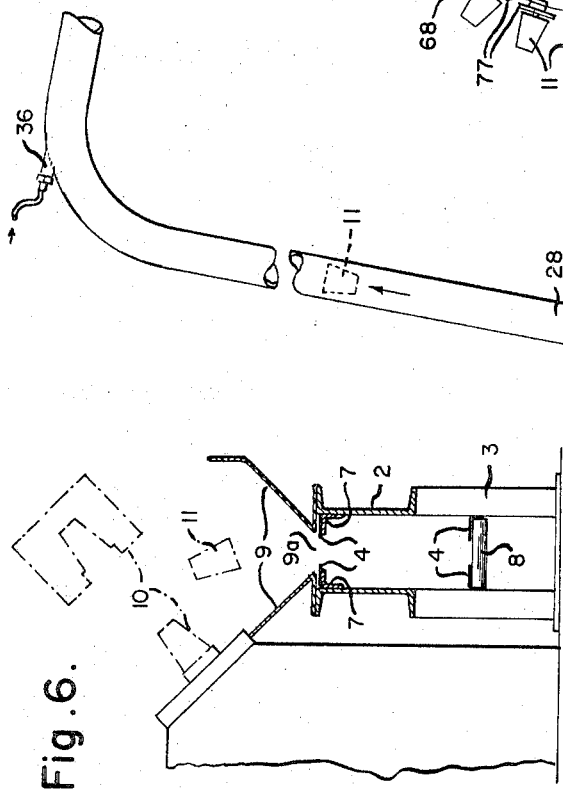
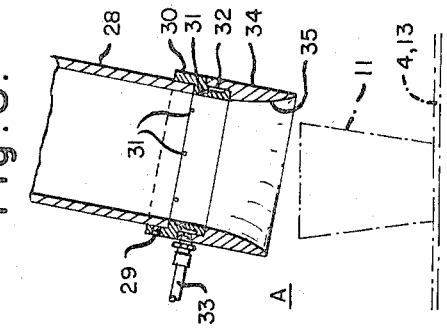
Nov. 7, 1967  A. I. W. FRANK  3,351,388
MECHANISM FOR HANDLING AND TESTING CONTAINERS
Filed June 29, 1965  8 Sheets-Sheet 2
INVENTOR
Alan I. W. Frank

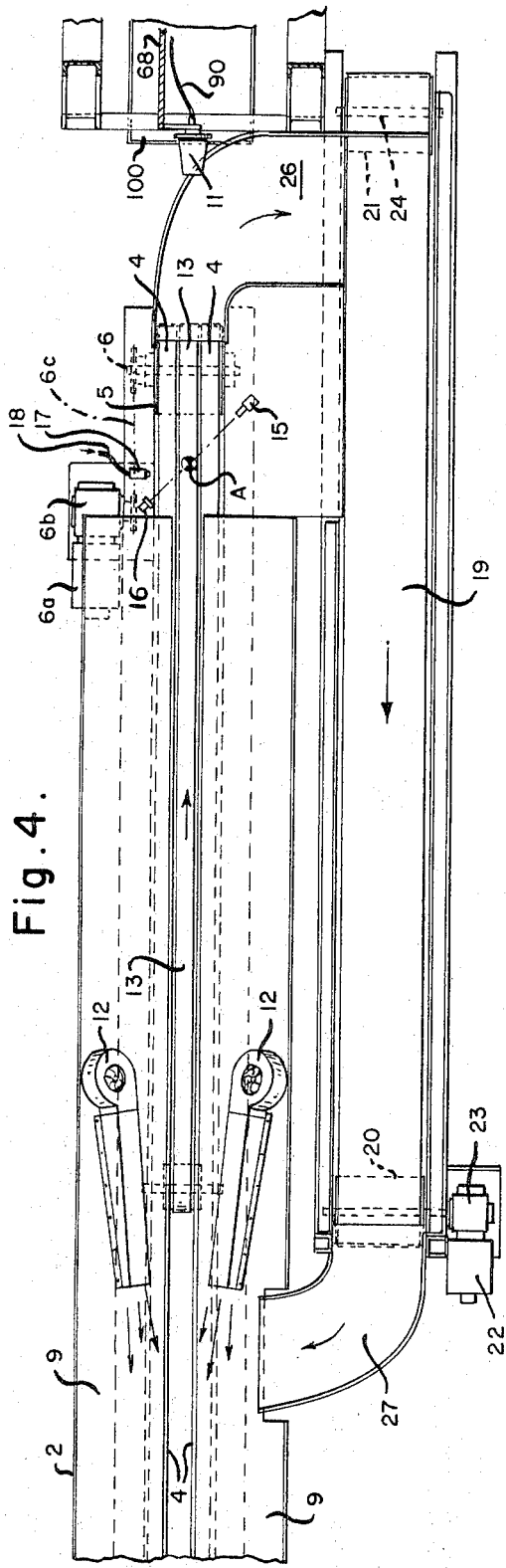

Nov. 7, 1967 A. I. W. FRANK 3,351,388
MECHANISM FOR HANDLING AND TESTING CONTAINERS
Filed June 29, 1965 8 Sheets-Sheet 5

INVENTOR
Alan I. W. Frank

Nov. 7, 1967  A. I. W. FRANK  3,351,388
MECHANISM FOR HANDLING AND TESTING CONTAINERS
Filed June 29, 1965  8 Sheets-Sheet 6
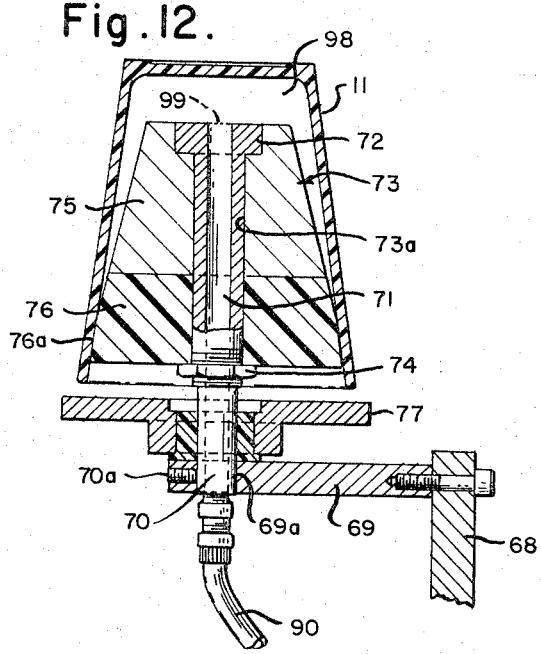
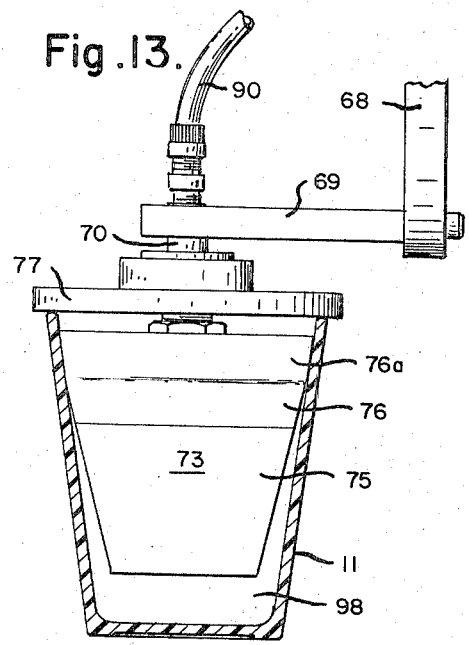
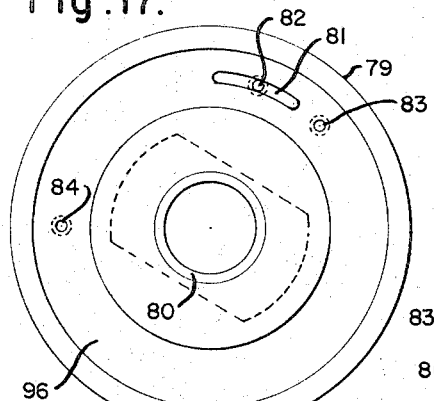
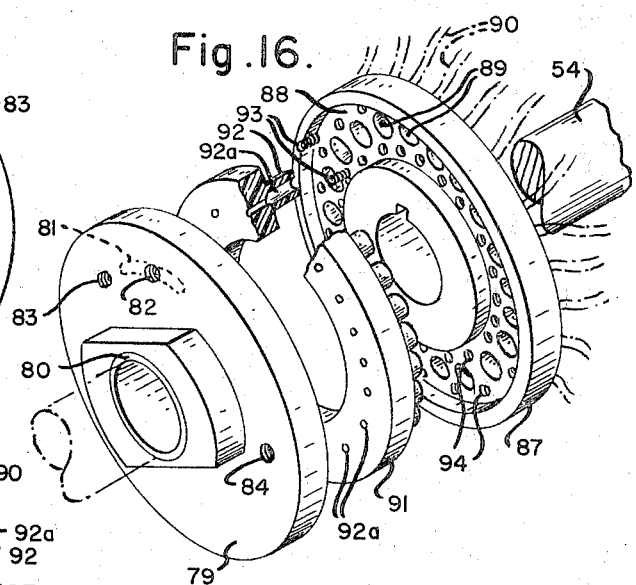
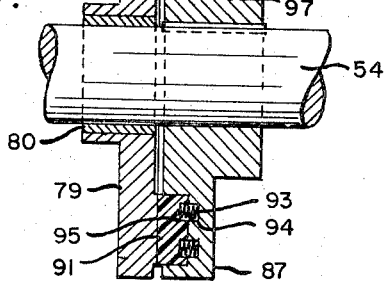
INVENTOR
Alan I.W. Frank

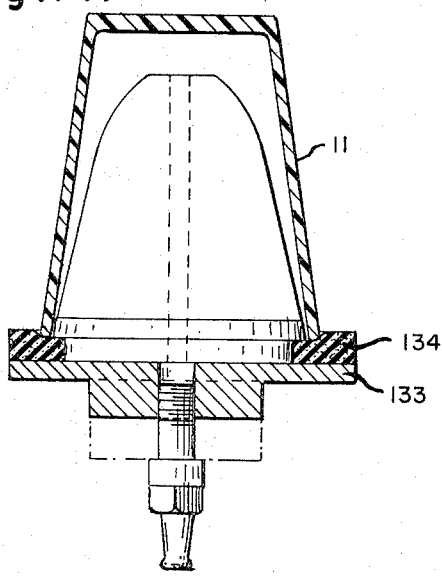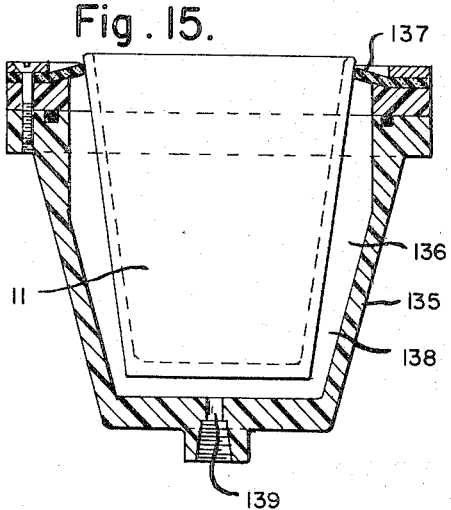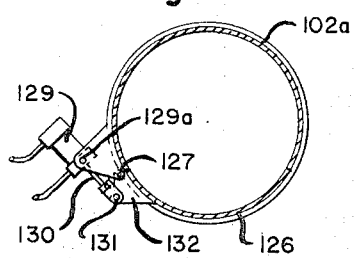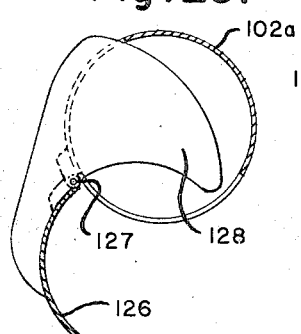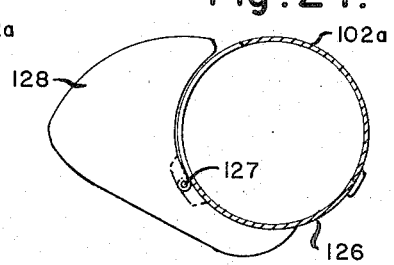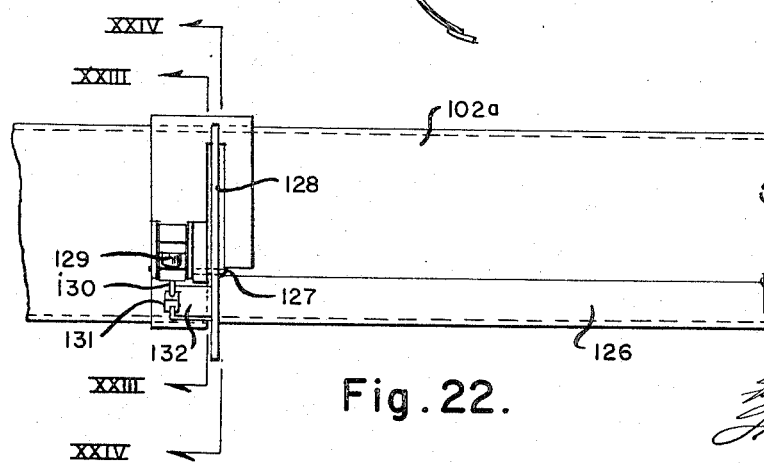

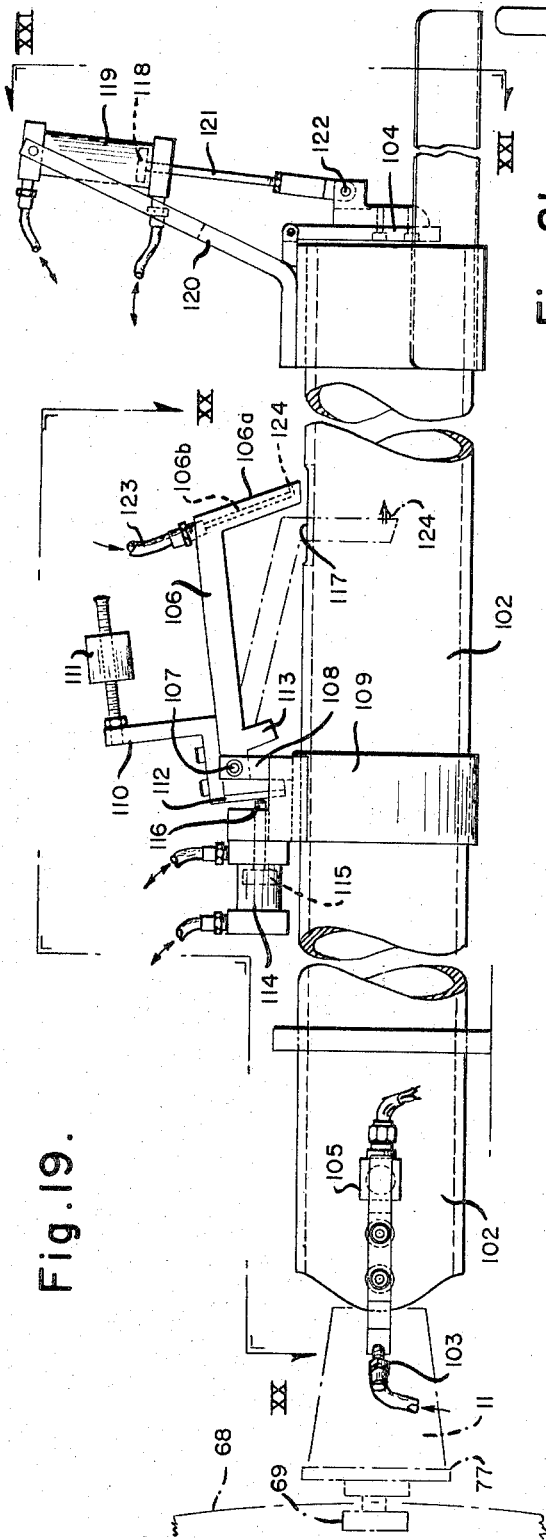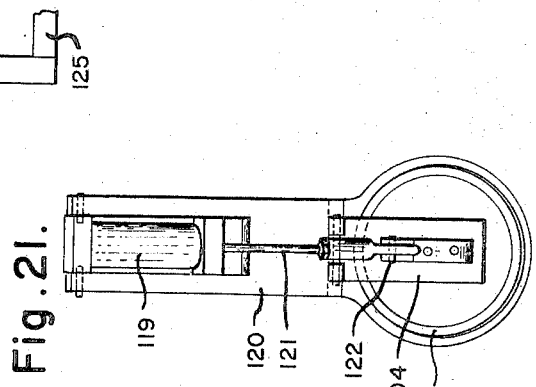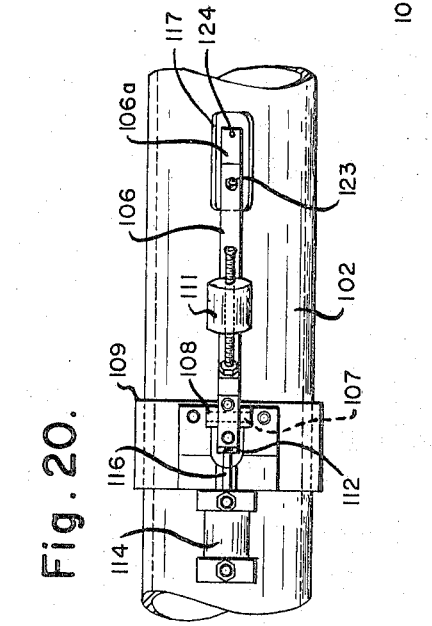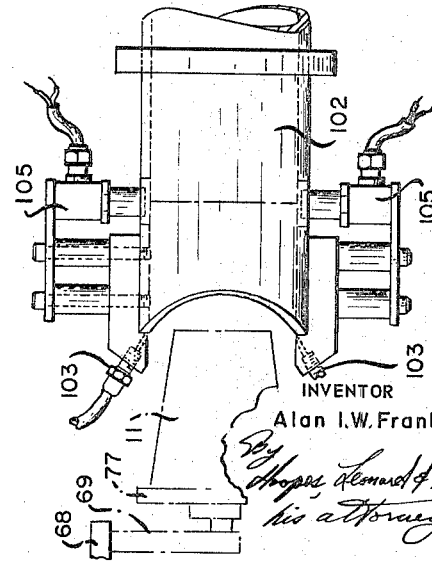

United States Patent Office 3,351,388
Patented Nov. 7, 1967

3,351,388
MECHANISM FOR HANDLING AND
TESTING CONTAINERS
Alan I W Frank, Pittsburgh, Pa., assignor to The Alan
I W Frank Corporation, Pittsburgh, Pa., a corporation
of Pennsylvania
Filed June 29, 1965, Ser. No. 468,005
6 Claims. (Cl. 302—2)

ABSTRACT OF THE DISCLOSURE

Mechanism for handling conical containers comprising parallel endless conveyor elements advancing the containers therebetween, means elevating the advancing containers to free them from the conveyor elements and suction means sucking up the freed containers. Means are provided for returning for recycling containers which are not sucked up. Means are also provided for segregating a counted number of nested containers and delivering the same while commencing the accumulation of a subsequent counted number of nested containers.

---

This invention relates to mechanism for handling and testing containers. It involves mechanism for orienting, stacking and testing containers, including separating containers free from leaks from those having leaks, and delivering the containers free from leaks in relative arrangement for packaging in groups.

While in certain of its aspects the invention has wide application I have found it to have especial utility in the handling and testing of light weight containers such as those molded out of plastic material such as polystyrene. The invention is of course equally adapted for handling and testing paper containers or those made out of other materials.

Portions of the mechanism are especially adapted for handling containers having a greater external transverse dimension at one end than at the opposite end which are open at the larger end and closed at the smaller end. An example is a tapered container such as a drinking cup or packaging container, although containers of non-tapered form with an external bead or flange at the open end may be handled.

For purposes of explanation and illustration I shall describe my mechanism as adapted for the handling and testing of tapered cups molded out of expandable polystyrene beads. Such beads are molded into tapered cups under heat and pressure as known to those skilled in the art. The molding is accomplished in molds having separable parts and at the conclusion of each molding cycle the parts are separated and the molded cups ejected. The cups may be ejected in various ways, as, for example, by air blast.

My apparatus is designed for use in a plant in which cups are delivered to a generally horizontal conveyor at locations alongside the conveyor. When cups molded out of expandable polystyrene beads are to be handled such cups may be delivered to the conveyor from molding machines disposed alongside the conveyor at one or both sides of the conveyor and ranged along the conveyor throughout any convenient distance. For example, each molding machine may contain four molds and thus produce four cups per cycle. There may be any number of molding machines ranged along the conveyor at each side thereof.

The cups delivered to the conveyor from the molding machines are delivered helter-skelter and may fall upon the conveyor in any orientation. I provide for advancing the cups and while advancing them uniformly orienting them. The cups are advanced to a removing station where they are removed from the conveyor and stacked. Prior to removal the cups are desirably acted on to facilitate their removal from the conveyor.

The stack of cups is used for feeding testing mechanism. The stack may be advanced toward the testing mechanism and cups fed one by one from the stack to the testing mechanism as the stack advances. The cups advancing to the stack may move through a tube of generally U shape, first upwardly, then generally horizontally and finally downwardly. I preferably provide means for interrupting the delivery of cups to the stack when the height of the stack exceeds a maximum predetermined height to prevent the cups at the top of the stack from binding in the elbow of the tube. Means are provided for preventing feeding of cups from the stack when the height of the stack becomes less than a minimum predetermined height until the stack builds up to a normal predetermined height.

Each cup is carried for testing by a receiving member which may be a mandrel over which the cup is positioned, or the member may have a cavity within which the cup is received. In either case space is provided between the receiving member and the cup and I provide for exhausting air from the space first to firmly seat the cup and second to test the cup for leaks. The receiving member carrying the cup preferably moves to a position in which the cup tends to drop away from the receiving member but if the cup is free from leaks it is held to the receiving member by the vacuum. A cup having a leak is not held by vacuum to the receiving member since the vacuum is dissipated through the leak so the cup tends to drop from the receiving member. To avoid a cup sticking to the receiving member even after dissipation of the vacuum through a leak in the cup I preferably provide means acting on the cup urging it to drop from the receiving member but with a force less than the vacuum force tending to hold a cup free from leaks to the receiving member. Thus a cup which is free from leaks remains on the receiving member while one which has a leak is separated from the receiving member. The cups having leaks are delivered to scrap.

The cups which are free from leaks are delivered to a receiving station where they are nested. Means including a counter are employed to separate the cups into groups of predetermined numbers for packaging. The groups of nested cups may be delivered either endwise or transversely.

Other details, objects and advantages of the invention will become apparent as the following description of certain present preferred embodiments thereof proceeds.

In the accompanying drawings I have shown certain present preferred embodiments of the invention in which FIGURE 1 is a fragmentary side elevational view illustrating purely diagrammatically machines for molding cups ranged alongside a generally horizontal conveyor onto which the cups are delivered from the molding machines in helter skelter fashion, i.e., with no uniformity or relationship of orientation, the cups being conveyed by the conveyor toward the right;

FIGURE 2 is a fragmentary side elevational view of another portion of my mechanism including a continuation of the generally horizontal conveyor shown in FIGURE 1 and showing, among other things, how the cups are uniformly oriented by that conveyor and means for removing the cups from the generally horizontal conveyor;

FIGURE 4 is a plan view of the mechanism shown in FIGURE 2;

FIGURE 5 is a plan view partly in horizontal cross section and with portions omitted for clarity of the structure shown in FIGURE 3;

FIGURE 6 is a vertical cross-sectional view taken on the line VI—VI of FIGURE 1;

FIGURE 8 is a fragmentary detail view in vertical cross section illustrating the means for removing the cups from the conveyor;

FIGURE 12 is a fragmentary vertical cross-sectional view showing a cup on a mandrel at the testing station, the cup being shown as applied to the mandrel;

FIGURE 13 is a view partly in elevation and partly in vertical cross section showing a cup on a mandrel in position to drop off of the mandrel if the cup contains a leak and illustrating a weight bearing against the rim of the cup to obviate sticking on the mandrel of a cup containing a leak;

FIGURE 14 is a fragmentary vertical cross-sectional view showing a modified form of mandrel;

FIGURE 15 is a fragmentary vertical cross-sectional view showing the receiving member as having a cavity in which the cup is disposed;

FIGURE 16 is an exploded isometric view of the mechanism for connecting the respective mandrels with a source of vacuum;

FIGURE 17 is a face view of the left hand circular element of FIGURE 16 as viewed from the right in FIGURE 16;

FIGURE 18 is an axial cross-sectional view through the mechanism shown in FIGURE 16 when such mechanism is collapsed with the parts in their normal cooperative relationship;

FIGURE 19 is a fragmentary elevational view with portions cut away of the mechanism for receiving from the testing mechanism the cups which are free from leaks and delivering those cups in nested arrangement with a predetermined number of cups in each group;

FIGURE 20 is a fragmentary plan view with portions cut away of part of the structure shown in FIGURE 19 taken on the line XX—XX of FIGURE 19;

FIGURE 21 is a vertical cross-sectional view taken on the line XXI—XXI of FIGURE 19;

FIGURE 22 is a fragmentary elevational view showing a modified form of mechanism for delivering groups of nested cups;

FIGURE 23 is a vertical cross-sectional view taken on the line XXIII—XXIII of FIGURE 22;

FIGURE 24 is a vertical cross-sectional view taken on line XXIV—XXIV of FIGURE 22; and FIGURE 25 is a vertical cross-sectional view through the mechanism shown in FIGURE 22 but with the cup delivering means open to deliver a stack of nested cups.

Figure 1:
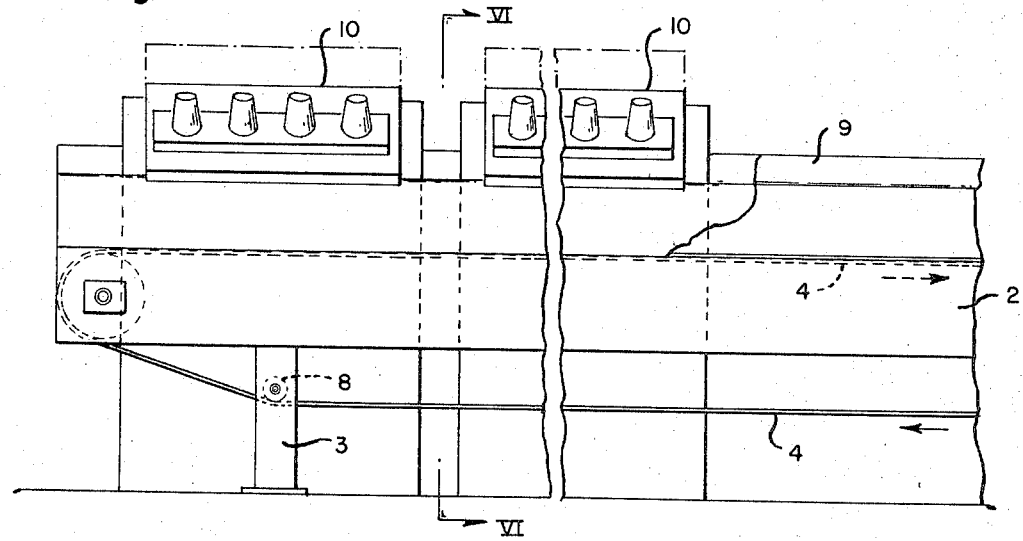
Figure 3:
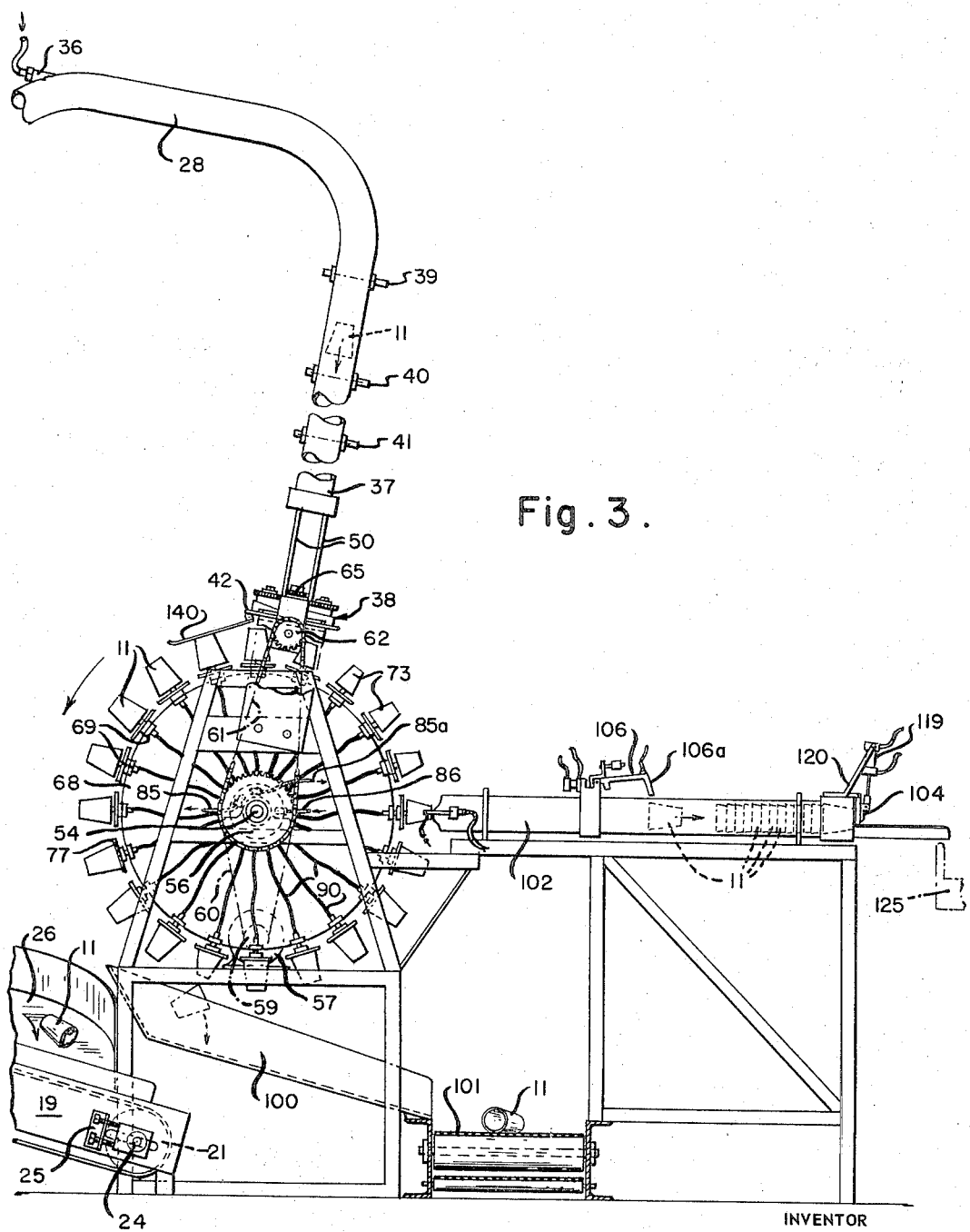
FIGURE 3 is a fragmentary side elevational view of a further portion of my mechanism in which the cups removed from the conveyor are stacked, delivered from the stack one by one to a testing station, tested to separate the cups free from leaks from those having leaks and the cups free from leaks delivered, counted, nested and discharged in groups each containing a predetermined number of cups.

Referring now more particularly to the drawings, reference numeral 2 designates generally a straight horizontal conveyor of considerable length. The conveyor is carried by a mounting structure 3 and comprises two spaced apart parallel endless belts 4 driven by a pulley 5. The direction of effective movement of the conveyor is as indicated by the arrows, i.e., from left to right in FIGURES 1, 2 and 4. It is to be understood that FIGURES 1, 2 and 3 together illustrate my mechanism in elevation, FIGURE 1 showing a portion of the left hand end of the conveyor 2 and FIGURE 2 showing the right hand end of the conveyor 2. The mechanisms shown in FIGURE 3 is a continuation toward the right from what is shown in FIGURE 2.

The pulley 5 is fixed to shaft 6 which is driven in the clockwise direction viewing FIGURE 2 by any suitable driving means such as an electric motor 6a with appropriate reduction gearing 6b and an endless driving element 6c such as a sprocket chain meshing with sprockets fixed to the output shaft of the reduction gearing 6b and the shaft 6. The upper reach of the conveyor 2 is the active reach, the conveyor belts 4 at the upper reach being supported upon angles 7 forming part of the mounting structure 3. The mounting structure 3 also includes rollers 8 rotatably supporting and guiding the lower returns reach of the conveyor. Also carried by the mounting structure 3 are upwardly and outwardly inclined generally planar cup receivnng and guiding elements which as clearly shown in FIGURES 6 and 7 form in effect a trough 9 extending along the upper reach of the conveyor 2 having a central longitudinal opening 9a which is somewhat wider than the space between the inner edges of the belts 4.

Ranged alongside the conveyor 2 are molding machines designated generally by reference numeral 10 in which cups of expandable polystyrene beads are molded. The molding machines may be conventional. Any desired number of them may be disposed at each side of the conveyor. They are positioned relatively to the conveyor so that at the conclusion of each molding cycle in each molding machine the cups molded therein are ejected from the molds into the trough 9. FIGURE 6 illustrates diagrammatically one of the molding machines 10 with the mold parts separated showing a cup falling into the trough. While the molding machines 10 which are diagrammatically illustrated are shown as having four molds each any number of molds may be included in each molding machine just as the number of molding machines employed may vary as desired.

Figure 7:
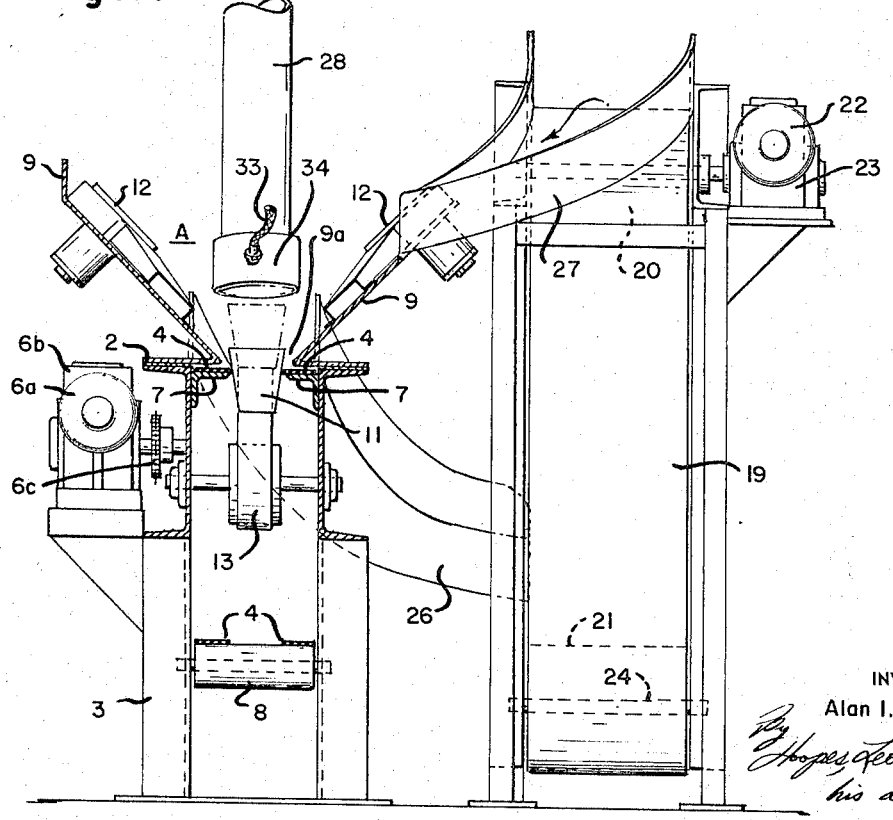
FIGURE 7 is a vertical cross-sectional view taken on the line VII—VII of FIGURE 2.

The molding machines intermittently eject into the trough 9 tapered cups having their larger ends open and their smaller ends closed. The trough directs the cups downwardly to the inner edges of the belts 4. The inner edges of the belts 4 are spaced apart a distance equal to the external diameter of the cups at a zone somewhat below their open larger ends. The cups tend to assume upright position supported by the inner edges of the belts 4 with the lower portions of the cups extending downwardly between the belts as shown in FIGURE 7. Since the belts are moving toward the right viewing FIGURES 1, 2 and 4 the cups are carried by the belts in that direction.

The cups 11 ejected from the molding machines 10 are delivered to the trough 9 in helter skelter fashion and not all of them initially assume upright position between the inner edges of the belts 4. Some of the cups may lie crosswise of the conveyor or be inverted. Some of them may tend to hang up in the trough out of contact with the conveyor. To insure that all of the cups will assume upright orientation between the inner edges of the belts 4 as shown in FIGURE 7 I provide blowers 12 at opposite sides of the trough blowing air blasts generally along the trough from right to left viewing FIGURES 1, 2 and 4 or in the direction opposite the direction of advance of the belts. The blowers 12 are directed generally along the respective inner walls of the trough and somewhat downwardly so that they blow toward the left viewing FIGURES 1, 2 and 4 cups which have not become properly oriented between the edges of the belts. Due to the light weight of the cups those which have not settled in upright position between the edges of the belts are blown back a substantial distance along the conveyor and hence are in a sense recycled giving them an opportunity to settle down in proper upright position between the belts. Any cups which do not do so are again blown back in the direction opposite the direction of advance of the conveyor.

The result is that by the time the cups approach the right hand end of the conveyor shown in FIGURE 2 they should all be properly oriented in upright position between the edges of the belts 4 of the conveyor 2.

In FIGURES 2 and 8 is shown a cup removing station designated generally by the letter A at which the cups 11 are removed from the conveyor. I provide an elevating conveyor 13 in the form of an endless belt whose width is slightly less than the distance between the inner edges of the belts 4 of the conveyor 2 and which is driven by the same pulley 5 which drives the conveyor 2. The upper active reach of the belt 13 is inclined to the horizontal from its left hand end toward the right viewing FIGURE 2 until it attains the level of the belts 4 at a point closely approaching the cup removing station A at which time the belt 13 becomes coplanar with the belts 4. The upper active reach of the belt 13 rides upon a support 14 which is shaped to cause the upwardly inclined movement of the belt 13 until it reaches the level of the belts 4 and thereafter generally horizontal movement of the belt 13 in coplanar relationship with the belts 4. Since the belts 4 and 13 are driven by the same pulley they in effect constitute a single coplanar conveyor when they reach the cup removing station A.

As clearly illustrated in FIGURE 2, the elevating conveyor 13 engages the bottoms of the cups 11 as they advance toward the right between the inner edges of the belts 4 and elevates the cups until their bottoms are coplanar with the upper surface of the belts 4. This has the advantage of freeing the cups from any frictional drag imposed by engagement therewith of the inner edges of the belts 4 and also presenting the cups at the proper level for their removal at the cup removing station A. Normally the cups will arrive at the station A singly although upon occasion a number of cups may be nested. Nested cups not exceeding three may be removed normally at the station A. A greater number of nested cups causes a jam at the station A. A jam may also be caused by cups otherwise improperly fed to the station A. To clear away a jam of cups at the station A I provide a light source 15 directed across the belts and slightly thereabove at the station A. The position of a cup at station A is indicated at A in FIGURE 4. The light source 15 normally shines on a photoelectric cell 16. A nozzle 17 connected through a flexible conduit 18 and a valve (not shown) with a source of compressed air is aimed across the belts at a level slightly above the upper surface of the belts. When a jam of cups occurs at the station A the light beam is interrupted. Momentary interruption of the light beam which occurs during normal operation will have no effect. When the light beam is interrupted for a predetermined period, as, for example, two seconds, the interruption acts through any suitable time delay means well known to those skilled in the art and which may be incorporated with the photoelectric cell 16 to open the valve to cause an air blast to issue from the nozzle 17 and blow across the belts at the station A and blow away any cups jammed at that station.

I provide a return conveyor 19 in the form of an endless belt trained about a driving pulley 20 and an idler pulley 21, the pulley 20 being driven by any suitable source of power such as an electric motor 22 and suitable reduction gearing 23. The pulley 21 is carried by a shaft 24 mounted for adjustment by means 25 to insure keeping the belt taut. A trough 26 extends from the end of the conveyor 2 to the belt 19 and a trough 27 exends from the belt 19 back into the trough 9. Any cups passing the station A will be delivered by the trough 26 to the belt 19 and also any jammed cups blown away from the station A by an air blast through the nozzle 17 will reach the belt 19. All cups on the belt 19 will be delivered by the trough 27 to the trough 9 at a point to the left of the blowers 12 whereby the cups will be recycled in the manner above described.

The cups are sucked up at the station A through a tube 28 of generally U shape as shown in FIGURES 2 and 3. The lower end of the entry leg of the tube 28 is shown to enlarged scale in FIGURE 8. Fastened thereto by screws 29 is a ring 30 having passage means 31 inclined upwardly and inwardly for blasting air into the bottom of the tube 28. The passage means 31 lead from an annular manifold 32 to which air under pressure is delivered through a conduit 33. A sleeve 34 having an internally flaring mouth 35 completes the structure at the lower end of the tube 28 and cooperates with the ring 30 to form the annular manifold 32. The upwardly inclined passage means 31 for blasting air into the lower end of the tube 28 may be a continuous annular passage or a series of bored passages communicating with the annular manifold 32. In either case an upward suction is created which draws cups at the station A upwardly into and through the tube 28. A booster nozzle 36 may be provided for applying further suction as desired.

The tube 28 is, as above stated, of generally U shape so that the cups sucked up thereby move in a U-shaped path in which their orientation is substantially reversed. As the cups move upwardly along the entry leg of the U-shaped path their larger open ends are disposed upwardly while in the return leg of such path the larger open ends of the cups are disposed downwardly. The cups enter a magazine 37 where they are stacked or nested. The stack of inverted cups moves downwardly to a feeder 38 presently to be described which feeds the cups one by one from the stack to testing mechanism shown in FIGURE 3. The feeder 38 operates most efficiently when a stack of cups having a height within predetermined limits is presented thereto. I provide three electric eye controls 39, 40 and 41 which insure maintenance of the stack of inverted cups within predetermined limits. When the top of the stack rises to the level of the control 39 the motor 6a driving the conveyors 2 and 13 is stopped. When the top of the stack falls below the control 39 the motor 6a restarts. When the top of the stack drops below the control 41 the feeder stops feeding cups. When the top of the stack after having dropped below the control 41 and after having risen above that control rises to the control 40 the feeder resumes taking cups from the bottom of the stack. The manner in which this is accomplished will presently be described.

Figure 10:
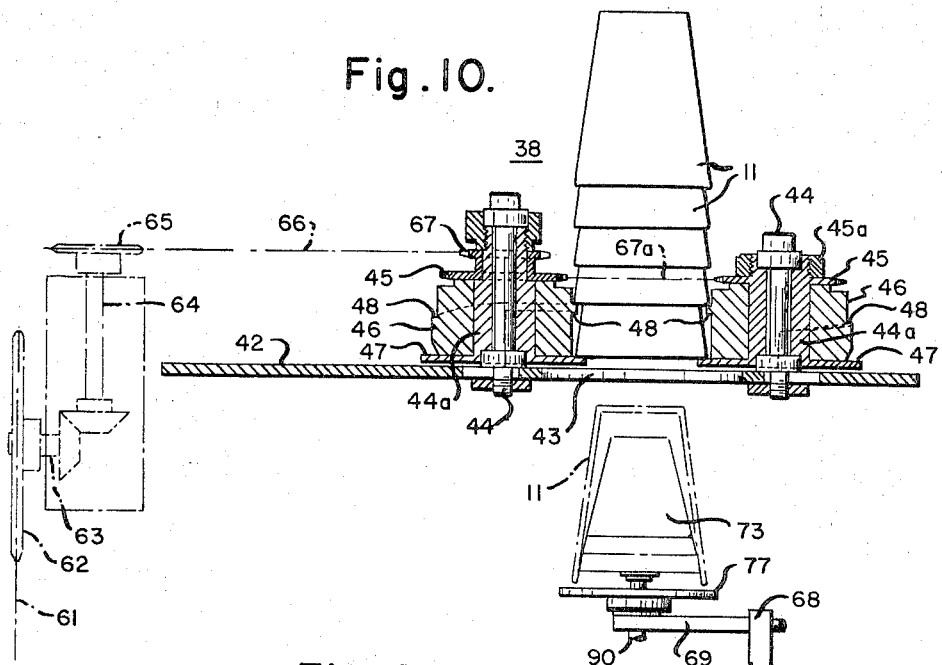
FIGURE 10 is a fragmentary vertical cross-sectional view taken on the line X—X of FIGURE 9.
Figure 9:
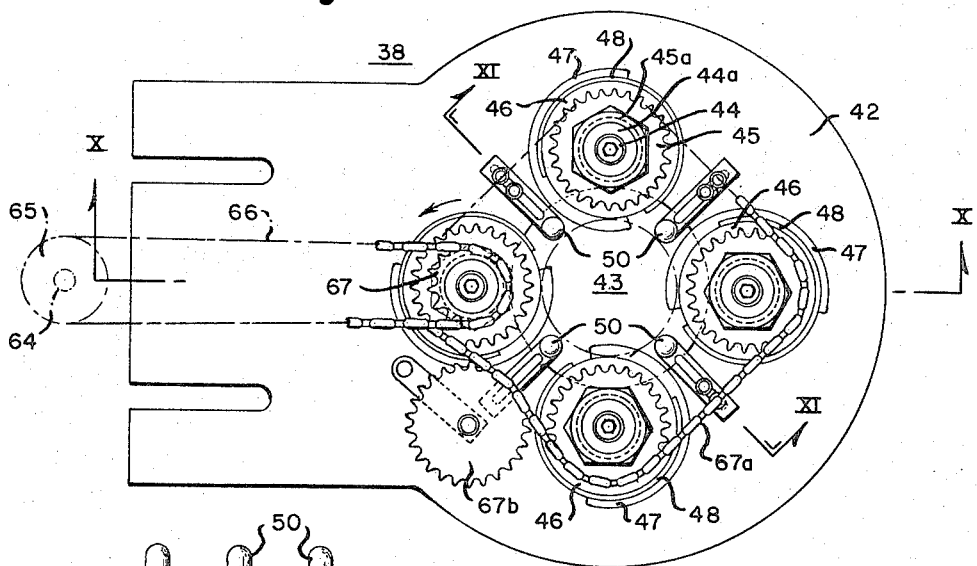
FIGURE 9 is a fragmentary detail plan view of the feeder for feeding the cups from the stack one by one to the testing station.
Figure 11:
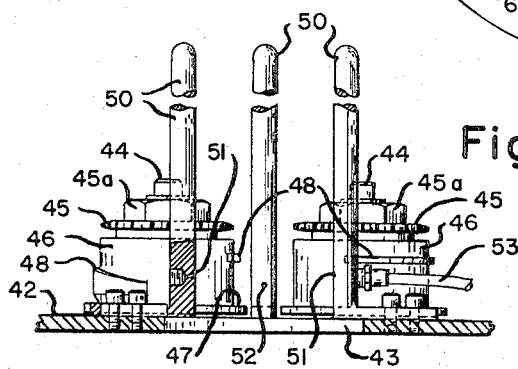
FIGURE 11 is a fragmentary vertical cross-sectional view taken on the line XI—XI of FIGURE 9.

The feeder 38 is shown in detail in FIGURES 9, 10 and 11. It comprises a base member 42 carried by the mounting structure having therethrough an opening 43 through which the cups are fed. The base member 42 carries uniformly spaced about the opening 43 generally upright spindles 44 each having a sleeve 44a rotatable thereon and having integral therewith a lower flange 47 extending throughout a portion of its periphery. Disposed about each sleeve 44a is a collar 46 having integral therewith an upper flange 48 extending throughout a portion of its periphery. Above each collar 46 is a sprocket 45, and a nut 45a is threaded onto the upper end of sleeve 44a and maintains the assembly of the sleeve 44a with is lower flange 47, the collar 46 with its upper flange 48 and the sprocket 45. A sprocket chain drive as shown in FIGURE 9 and which in turn is driven by means presently to be described rotates the collars 46 in unison.

The flanges 47 and 48 are so designed that upon each cycle of the feeder the bottom cup of the stack of cups moving downwardly through the magazine 37 is first temporarily supported by the flanges 48 and as the collars rotate the flanges 48 move out of the path of the cup and allow the bottom cup to drop to be supported upon the flanges 47. The flanges 48 again become operative to support the next cup and after an interval the lowermost cup is released by movement of the flanges 47 out of its path so that the cup moves downwardly to a cup receiving member shown in FIGURE 10 as in the form of a mandrel 73.

The base member 42 carries four posts 50 extending generally upwardly and serving as confining guides for the stack of inverted cups. The posts 50 have bores therethrough for air blasts. Two opposed posts have generally upwardly inclined bores 51. The other two opposed posts have generally downwardly inclined bores 52. Conduits 53 extend to all of the bores from a source of compressed air with suitable valving. The primary function of the air blasts through the bores 51 and 52 is to assist in separation of the bottom cup of the stack of inverted cups from the cup next above. The upwardly inclined bores 51 direct their air blasts against the bottom rim of the cup which is next above the cup at the bottom of the stack while the downwardly inclined bores 52 direct their blasts against the outer surface of the lowermost cup near the larger open end thereof, the combined effect of the air blasts through the bores 51 and 52 being to assist in separating the bottommost cup from the cup next above it in the stack. However the blasts through the bores 51 have a secondary function. When the top of the stack descends below the control 41 the magnitude of the blasts through the bores 51 is increased through suitable control means well known to those skilled in the art so that the augmented blasts through the bores 51 hold up the stack interrupting the taking of cups from the bottom of the stack by the feeder 38. When the top of the stack rises to the control 40 the blasts through the bores 51 return to normal and feeding of cups is resumed.

Mounted for rotation in the supporting structure is a shaft 54 having a sprocket 55 fixed thereto at one end and a sprocket 56 fixed thereto at the opposite end. An electric motor 57 acting through reduction gearing 58 and a driving sprocket 59 drives the shaft 54 through the sprocket 55 by a sprocket chain 60. Another sprocket chain 61 meshes with the sprocket 56 and with a sprocket 62 carried by a shaft 63 which through bevel gearing drives a shaft 64 carrying a sprocket 65. A sprocket chain 66 meshes with the sprocket 65 and a sprocket 67 integral with one of the sprockets 45 (see FIGURE 10) whereby to drive the feeder 38. A sprocket chain 67a is trained about the meshes with the four sprockets 45. The sprocket chain 67a is maintained taut by an adjustable tightener sprocket 67b. Keyed to the shaft 54 is a disc 68 carrying at its periphery a circumferential series of laterally projecting arms 69. Each arm 69 has a bore 69a receiving a hollow stem 70 fixed in place by a set screw 70a, the hollow stem 70 extending radially outwardly in relation to the axis of the shaft 54 and having a bore 71 therethrough and a flange 72 at its outer end. A mandrel designated generally by reference numeral 73 is carried by each stem 70, each mandrel 73 having a bore 73a receiving the hollow stem 70 and being maintained in place by being pressed against the flange 72 by a nut 74 threaded onto the stem. Each mandrel 73 has a wooden portion 75 and a portion 76 of Teflon. The surface of the portion 75 and the surface of part of the portion 76 are continuously conical as shown in FIGURE 12 while the extreme part of the portion 76 at the larger end of the mandrel is angularly offset to provide an outwardly facing annular conical surface 76a for sealing within one of the cups 11. A weight 77 of brass or other heavy material is slidably applied to each stem 70 and has a diameter somewhat greater than the diameter of the lip of the cup 11. As the shaft 54 carrying the disc 68, which in turn carries the mandrels 73, rotates the mandrels successively move into position to receive cups fed thereto one by one by the feeder 38, the parts being timed so that a cup is fed to each mandrel as the mandrel moves into position below the feeder to receive the cup.

Fixedly mounted upon a bracket 78 is a disc 79 through which the shaft 54 passes as shown in FIGURES 16 and 18. A bushing 80 is interposed between the disc 79 and the shaft 54. At one face of the disc 79 (the face which is directly viewed in FIGURE 17 and which is toward the right and obscured from view in FIGURE 16) is an arcuate slot 81 with a bore 82 communicating with the arcuate slot and extending through the disc to the opposite face of the disc. Also extending through the disc 79 are two other bores 83 and 84 respectively. Separate suction lines 85 and 85a from a suitable vacuum pump extend to the bores 82 and 83 respectively. A pressure line 86 from a suitable air compressor extends to the bore 84.

Keyed to the shaft 54 is a circular member 87 having in the face thereof which is disposed toward the disc 79 an annular channel 88. Bores 89 arranged in a circle about the axis of the circular member 87 and equally spaced are formed through the member 87 and intersect the annular channel 88. An intermediate annular member 91 is disposed between the disc 79 and the member 87 as shown in FIGURE 18. The intermediate member 91 has an annular series of projections 92 each having a bore 92a therethrough, each projection 92 extending through one of the bores 89 of the member 87 as shown in FIGURE 18. A flexible conduit 90 extends from each bore 92a to one of the hollow stems 70, twenty such hollow stems each with a mandrel 73 thereon being shown.

Compression coil springs 93 are seated in sockets 94 in the member 87 and in sockets 95 in the intermediate member 91 and press the intermediate member 91 toward the disc 79. The engaging faces 96 of the disc 79 and 97 of the intermediate member 91 are machined smooth so that the bores 92a are closed by the disc 79 except when they are opposite either the arcuate slot 81 or the bore 83 or the bore 84. When for example the arcuate slot 81 is opposite bores 92a in the intermediate member 91 suction is drawn from the spaces between the mandrels in communicating with the arcuate slot 81 through conduits 90 and the cups 11 thereon. As shown in FIGURES 12 and 13 the mandrels are designed to provide substantial space 98 between each mandrel and the cup thereon. The arcuate slot 81 causes suction to be drawn through three mandrels simultaneously to seat the cups firmly on the mandrels. Thereafter the suction is momentarily broken and then suction for testing is drawn through each mandrel individually. A screen 99 is provided over the outlet of the bore 71 of each stem 70 to inhibit drawing therethrough any unformed beads which may be present. When a bore 92a is opposite the bore 84 a blast of air under pressure is delivered through the corresponding mandrel throughout an arc such that cups are being As each cup is fed by the feeder 38 onto a mandrel 73 suction is drawn through the mandrel to firmly seat the cup on the mandrel. By reason of the provision of the arcuate slot 81 seating suction is applied through each mandrel throughout an arc such that cups are being seated on three mandrels simultaneously thereby. Seating of the cups on the mandrels is assisted by an arm 140 of "Teflon" hinged to the base member 42 and bearing by gravity on the bottoms of the inverted cups. Thereafter, as above mentioned, the suction is momentarily shut off and testing suction is applied through the bore 83. That suction is maintained as the disc 68 rotates. The suction is maintained through the fact that the bores 92a after passing the bore 83 are sealed by the face 96 of the disc 79. The mandrels successively move about the axis of the shaft 54 gradually changing orientation to a position in which the cups are below the mandrels and tend to fall off by gravity. A cup which is free from leaks will remain on its mandrel because the suction will be maintained. The suction will be destroyed in a cup having a leak. That cup should drop off of the mandrel by gravity. However if there is a tendency for a cup having a leak to stick on its mandrel the cup will be separated from the mandrel by the weight 77. As shown in FIGURE 3, as the axes of the mandrels pass horizontal position the weights 77 slide toward the cups and bear on the lips of the cups. The weights are designed to exert on the cups a pressure somewhat less than the suction which holds cups free from leaks on the mandrels. Thus a cup which is free from leaks will remain on its mandrel with the weight 77 bearing against its lip but a cup having a leak in which the suction has been broken will be forced off of the mandrel by the weight 77. Cups having leaks fall into a chute 100 and move down through the chute onto a scrap conveyor 101 whence they are delivered to scrap.

Cups which are free from leaks remain on their mandrels until each thereof is in position with its axis substantially horizontal at the right hand side of the disc 68 viewing FIGURE 3. At that time the bore 92a corresponding to a cup whose axis is substantially horizontal comes into line with the bore 84 and the cup is blown off of the mandrel toward the right viewing FIGURE 3.

The cups free from leaks which are blown off of the mandrels toward the right viewing FIGURE 3 are received within a tube 102. At the mouth of the tube 102, i.e., the left hand end viewing FIGURE 20, nozzles 103 direct air blasts into the tube to supplement the air blast ejecting the cup from the mandrel and insuring movement of the cup toward the right in the tube 102. The cups pass through the tube 102, the first cup being halted by a retractable stop 104. Succeeding cups nest with the cup against the stop 104. The cups are counted by a counter 105, and when a predetermined number of cups have passed the counter 105 the counter actuates means for segregating or separating the predetermined number of cups for delivery as a group in relative arrangement for packaging.

A generally L-shaped lever 106 is pivoted at 107 to a bracket 108 carried by a band 109 disposed about the tube 102. The lever 106 in turn carries a bracket 110 carrying an adjustable counterweight 111. The bracket 110 has a downwardly projecting heel 112 and the lever 106 has a downwardly projecting stop member 113. Mounted on the band 109 is a cylinder 114 in which operates a piston 115 whose piston rod 116 bears against the heel 112 of the bracket 110 which is to all intents and purposes integral with the lever 106. Normally the piston 115 is at the right hand end of the cylinder 114 viewing FIGURE 19 which raises the lever 106 to inoperative position as shown in solid lines in that figure. When the counter 105 has counted a predetermined number of cups the counter operates means causing the piston 115 to be moved to the left hand end of the cylinder 114 viewing FIGURE 19 and the lever 106 moves by gravity down to its operative position as shown in chain lines in FIGURE 19. The down-turned end portion 106a of the lever 106 enters the tube 102 through a slot 117 so that it is interposed in the path of cups moving from left to right in the tube. Thus any cups reaching the portion 106a of the lever 106 extending down into the tube 102 are stopped thereby.

Meanwhile the predetermined number of cups counted by the counter 105 are nested and disposed against the stop 104. At approximately the same time as the lever 106 moves down to operative position a piston 118 in a cylinder 119 carried by a bracket 120 mounted on the end of the tube 102 is moved upwardly in the cylinder 119, the piston rod 121 through its pivotal connection 122 with the retractable stop 104 raising that stop to retracted or inoperative position and thus opening the end of the tube 102. Air under pressure is admitted to a bore 106b in the downwardly extending portion 106a of the lever 106 through a conduit 123, the compressed air emerging as a blast through the outlet 124. When the end of the tube 102 has been opened by raising of the retractable stop 104 the air blast through the outlet 124 blows the counted group of nested cups out of the end of the tube 102 to fall upon a conveyor 125 or be otherwise handled for packaging and shipping.

As soon as the counted group of nested cups has been ejected from the end of the tube 102 the stop 104 is returned to operative position and the lever 106 is raised to its inoperative position and whatever cups were seated against the portion 106a of lever 106 while that lever was in operative position are released and are blown to the right by the blasts from the nozzles 103 until they lodge against the stop 104. Cups continue to be nested with the cups lodged against the stop 104 until the predetermined number of cups has passed the counter 105 when the cycle as above described is repeated.

FIGURES 22–25 show a modified structure in which a tube 102a used in place of the tube 102 above described has its end permanently closed at 104a as shown in FIGURE 22. In this case the counted group of nested cups may be discharged transversely, and as shown downwardly, by opening a portion of the tube 102a. A portion 126 of the tube 102a is pivoted to the body of the tube at 127 and is movable between closed position as shown in FIGURES 22 and 24 and open position as shown in FIGURE 25. Connected with the portion 126 of the tube is a stop member 128 arranged so that when the portion 126 is in its lowered position to open the tube the stop member 128 extends across the tube to stop cups from entering the tube. The portion 126 is moved between open position as shown in FIGURE 25 and closed position as shown in FIGURES 22 and 24 by a piston in a cylinder 129 having a piston rod 130 pivoted at 131 to a bracket 132 integral with the portion 126. The cylinder 129 is pivoted to the body of the tube 102a at 129a.

The counter 105 will be used with the structure of FIGURES 22–25. When a predetermined number of cups has passed the counter and lodged against the end 104a of the tube 102a the portion 126 of the tube 102a will be lowered to open position and the stop 128 disposed across the tube to stop oncoming cups. The counted group of nested cups in the tube 102a drops out by gravity whereupon the tube is again closed and the stop 128 moved out to inoperative position as shown in FIGURE 24 and any cups which accumulated against the stop 128 while the tube was open are advanced to the end 104a by the blasts through the nozzles 103.

FIGURE 14 shows a modified form of mandrel which includes a radially extending portion 133 carrying an annulus 134 of rubber-like or plastic material against which the lip of the cup 11 may be sealed instead of sealing the cup to the outer surface of the mandrel as in FIGURE 12.

FIGURE 15 shows a cup receiving member 135 used in place of a mandrel receiving a cup 11 in upright instead of inverted position. The member 135 has a cup receiving cavity 136 and an inwardly projecting annular sealing member 137 at its mouth for sealing against the outer surface of the cup near the lip of the cup as shown in FIGURE 15. The air in the space 138 between the receiving member 135 and the cup 11 may be exhausted through the passage 139.

Either of the cup receiving members shown in FIGURES 14 and 15 may be substituted for that shown in FIGURE 12 although if the cup receiving member of FIGURE 15 is used the means for feeding the cups will have to be modified.

Thus I have provided mechanism for handling and testing containers which is fully automatic and accomplishes the handling and testing of the containers at high speed and with great efficiency. Containers having leaks are effectively eliminated and containers free from leaks are assembled or nested in groups of predetermined number ready for packaging and shipping.

Subject matter disclosed but not claimed herein is claimed in divisional applications Ser. Nos. 558,525 and 558,526, filed April 15, 1966.

While I have shown and described certain present preferred embodiments of the invention it is to be distinctly understood that the invention is not limited thereto but may be otherwise variously embodied within the scope of the following claims.

I claim:

1. Mechanism for handling containers having a greater external transverse dimension at one end than at the opposite end which are open at the larger end and closed at the smaller end comprising at a conveying zone parallel generally horizontal spaced apart endless conveyor elements between which such containers are adapted to lodge with the closed smaller end down and with a portion near the open larger end engaged by the conveyor elements, means for driving the conveyor elements to advance the containers toward a container removing station, a container removing station having means including means engaging the containers and elevating them to a position out of contact with the parallel conveyor elements and suction means sucking up the thus elevated containers after they have moved out of contact with the parallel conveyor elements and thus are freed from any frictional drag thereon of the parallel conveyor elements for removing the containers from between the parallel conveyor elements and means separate from the last mentioned means for removing and returning to the conveying zone containers which are not sucked up by the suction means at the container removing station whereby such containers are recycled for removal upon a succeeding cycle.

2. Mechanism for handling containers having a greater external transverse dimension at one end than at the opposite end which are open at the larger end and closed at the smaller end comprising parallel generally horizontal spaced apart endless conveyor elements between which such containers are adapted to lodge with the closed smaller end down and with a portion near the open larger end engaged by the conveyor elements, means for driving the conveyor elements to advance the containers toward a container removing station and a container removing station including means engaging the containers and elevating them to a position out of contact with the parallel conveyor elements and a generally upwardly extending tube having its open lower end disposed immediately above the path of the containers after they have moved out of contact with the parallel conveyor elements and thus are freed from any frictional drag thereon of the parallel conveyor elements and means for creating suction in the tube to suck up the containers.

3. Mechanism for handling nestable containers comprising means for delivering such containers one by one in a predetermined path, a receiving station including stop means receiving the delivered containers in nested relationship, a stop member movable between an inoperative position and an operative position across the path of delivery of the containers in between containers, means including a counter operative after a predetermined number of such containers have been delivered to the receiving station to move the stop member to operative position behind such predetermined number of delivered containers, means for removing such predetermined number of delivered containers from the receiving station while subsequently delivered containers are delivered against the stop member while the stop member is in operative position and means moving the stop member to inoperative position after such predetermined number of delivered containers have been removed from the receiving station so that the containers subsequently delivered against the stop member advance to form the nucleus of the succeeding predetermined number of delivered containers.

4. Mechanism for handling nestable containers as claimed in claim 3 in which the means for removing the predetermined number of delivered containers from the receiving station comprise air blast means in the stop member.

5. Mechanism for handling nestable containers as claimed in claim 3 in which the means for removing the predetermined number of delivered containers from the receiving station comprise an openable portion of the receiving station permitting transverse removal of the predetermined number of delivered containers from the receiving station.

6. Mechanism for handling nestable containers as claimed in claim 5 in which the openable portion of the receiving station and the stop member are connected so that the stop member is in operative position when said portion of the receiving station is open and in inoperative position when said portion of the receiving station is closed.

References Cited
UNITED STATES PATENTS

| | | | |
|---|---|---|---|
| 862,923 | 8/1907 | Linsley | 221—296 |
| 2,381,505 | 8/1945 | Lindholm | 198—37 |
| 2,781,947 | 2/1957 | Webster | 221—298 |
| 2,880,850 | 4/1959 | Keathley | 198—185 |
| 2,912,282 | 11/1959 | Schult | 302—2 |
| 3,061,069 | 10/1962 | Young | 198—33.1 |
| 3,086,822 | 4/1963 | Fibish | 198—33.1 |
| 3,192,565 | 7/1965 | Rukavina | 214—6 |
| 3,195,451 | 7/1965 | Hovekamp | 198—19 |
| 3,198,581 | 8/1965 | Gamberini | 302—2 |

EVON C. BLUNK, *Primary Examiner.*

RICHARD E. AEGERTER, *Examiner.*

UNITED STATES PATENT OFFICE

CERTIFICATE OF CORRECTION

Patent No. 3,351,388                        November 7, 1967

Alan I W Frank

It is hereby certified that error appears in the above numbered patent requiring correction and that the said Letters Patent should read as corrected below.

Column 4, line 2, for "mechanisms" read -- mechanism --; line 16, for "turns" read -- turn --; line 18, for "receivnng" read -- receiving --; line 26, for "cnps" read -- cups --; column 7, line 36, for "the", first occurrence, read -- and -- column 8, line 40, for "throughout an arc such that cups are being" read -- to eject the cup therefrom. --.

Signed and sealed this 19th day of November 1968.

(SEAL)
Attest:

Edward M. Fletcher, Jr.                            EDWARD J. BRENNER
Attesting Officer                                    Commissioner of Patents